United States Patent [19]

Channell et al.

[11] Patent Number: 5,683,344
[45] Date of Patent: Nov. 4, 1997

[54] METHOD FOR SOLIDIFICATION AND STABILIZATION OF SOILS CONTAMINATED WITH HEAVY METALS AND ORGANIC COMPOUNDS INCLUDING EXPLOSIVE COMPOUNDS

[75] Inventors: Michael G. Channell; Beth C. Fleming, both of Vicksburg, Miss.

[73] Assignee: The United States of America as represented by the Secretary of the Army, Washington, D.C.

[21] Appl. No.: 693,652

[22] Filed: Aug. 9, 1996

[51] Int. Cl.⁶ .................................. A62D 3/00; B09B 3/00
[52] U.S. Cl. .................... 588/257; 106/706; 106/707; 106/709; 106/DIG. 1; 405/129; 588/252
[58] Field of Search .................................. 106/697, 705, 106/706, 707, 708, 709, DIG. 1; 405/128, 129; 588/252, 256, 257, 259

[56] References Cited

U.S. PATENT DOCUMENTS

| | | |
|---|---|---|
| 3,870,535 | 3/1975 | Minnick et al. |
| 4,432,666 | 2/1984 | Frey et al. ........................ 405/129 X |
| 4,615,809 | 10/1986 | King. |
| 4,650,590 | 3/1987 | Beall .................................... 210/691 |
| 5,238,583 | 8/1993 | Fortson ............................ 210/766 X |
| 5,304,709 | 4/1994 | Babcock et al. ...................... 588/257 |
| 5,347,077 | 9/1994 | Hooykaas et al. .................... 588/257 |
| 5,387,738 | 2/1995 | Beckham et al. .................... 588/256 |
| 5,430,235 | 7/1995 | Hooykaas et al. .................... 588/252 |
| 5,439,318 | 8/1995 | Stark ................................... 405/128 |
| 5,556,447 | 9/1996 | Srinivasachar et al. .............. 588/256 |

Primary Examiner—George A. Suchfield
Attorney, Agent, or Firm—Luther A. Marsh

[57] ABSTRACT

A method for solidification and stabilization of soils contaminated with heavy metals and organic compounds removable by activated carbon includes the steps of placing a selected weight of the contaminated soil in a vessel, adding water to the contaminated soil in the vessel, mixing the soil and the water in the vessel, adding activated carbon to the mixture of soil and water in the vessel, mixing the soil, water and carbon in the vessel, adding cement and fly ash to the mixture of soil, water and carbon in the vessel, mixing the soil, water, carbon, cement and fly ash in the vessel and pouring the mixture of soil, water, carbon, cement and fly ash into a mold and curing the mixture therein.

15 Claims, 1 Drawing Sheet

METHOD FOR SOLIDIFICATION AND STABILIZATION OF SOILS CONTAMINATED WITH HEAVY METALS AND ORGANIC COMPOUNDS INCLUDING EXPLOSIVE COMPOUNDS

BACKGROUND OF THE INVENTION

1. Field of the Invention

The invention relates to solidification and stabilization of contaminated soils, and is directed more particularly to solidification and stabilization of soils contaminated with heavy metals and organic compounds, particularly explosive compounds.

2. Description of the Prior Art

Solidification/stabilization (S/S) is a process that involves the mixing of a contaminated soil or sludge with a binder material to enhance the physical and chemical properties of the soil/sludge and to chemically bind any free liquid. Solidification is generally conceptualized as the enhancement of the physical characteristics of the waste material. This is accomplished by reducing exposed surface area, which in turn lowers the convective transport of contaminants from the waste. Solidification usually entails the incorporation of the waste into a solid matrix monolith. Stabilization involves the reaction of the waste's hazardous waste constituents with the S/S reagents to immobilize or otherwise contain them. The stabilization process may be as simple as the addition of lime, or a sulfide source, to a heavy metal liquid waste, or may involve the development of special reagents specifically formulated to interact with the waste components. Most commercial vendors use a combination of solidification and stabilization to maximize the contaminant immobilization capability of the treated waste.

Several binder systems are currently available and widely used for the S/S of hazardous wastes. Typical binders include Portland cements, pozzolans, and thermoplastics. Most common S/S techniques include either Portland cement or some type of pozzolans as the basic reagent. Portland cement is widely available, relatively economical, and well known to the general public as producing a very durable product. Pozzolans are siliceous materials that, when added to a source of lime, will undergo a cementatious process similar to Portland cement, but at a much slower rate. Fly ash and blast-furnace slags are common pozzolans that are generally considered as waste materials themselves. Kiln dust is also a pozzolan and a waste material. Kiln dust is generated from the production of lime or cement. Although the quality of kiln dusts varies, kiln dust generally contains enough lime and fly ash to set simply with the addition of water.

Department of Defense sites across the United States have become a concern because of the presence of hazardous materials used in conjunction with past or present operations. In particular, soils contaminated with both heavy metals and explosive compounds have proven particularly difficult to manage. Solidification and stabilization is the best demonstrated available technology for the clean-up of sites that are contaminated with heavy metals. S/S is accomplished by mixing pozzolonic binder (cement, kiln dust, lime/fly ash, etc.) with a soil or sludge to obtain a monolithic material with the potential to pass all appropriate requirements for ultimate disposal in a non-hazardous commercial landfill. Currently, the application of S/S in the case of explosive contaminated soils is limited because of the negative interaction of the explosive compound and the pozzolonic reaction.

There is thus a need for an S/S process by which soil contaminated with heavy metals and explosive compounds may be rendered suitable for land-fill operations.

SUMMARY OF THE INVENTION

Accordingly, an object of the invention is to provide a method for the solidification and stabilization of soils contaminated with heavy metals and organic compounds removable by activated carbon, particularly explosive compounds.

With the above and other objects in view, as will hereinafter appear, a feature of the invention is the provision of a method for solidification and stabilization of soil contaminated with heavy metals and organic compounds removable by activated carbon, the method comprising the steps of placing a selected weight of the contaminated soil in a vessel, adding water to the contaminated soil in the vessel until the weight of the water added is equal to about 20%–30% of the weight of the soil, mixing the soil and the water in the vessel, adding activated carbon to the mixture of soil and water in the vessel until the weight of the activated carbon added is equal to about 10%–20% of the selected weight of the soil placed in the vessel, mixing the soil, water and carbon in the vessel, adding cement and fly ash to the mixture of soil, water and carbon in the vessel until the weight of the cement added equals about 30% of the selected weight of the soil placed in the vessel, and the weight of the fly ash added equals about 10% of the selected weight of the soil placed in the vessel, mixing the soil, water carbon, cement and fly ash in the vessel, and pouring the mixture of soil, water, carbon, cement and fly ash into a mold and curing the mixture therein.

The above and other features of the invention, including various novel details and combinations of steps, will now be more particularly described with reference to the accompanying drawings and pointed out in the claims. It will be understood that the particular method embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
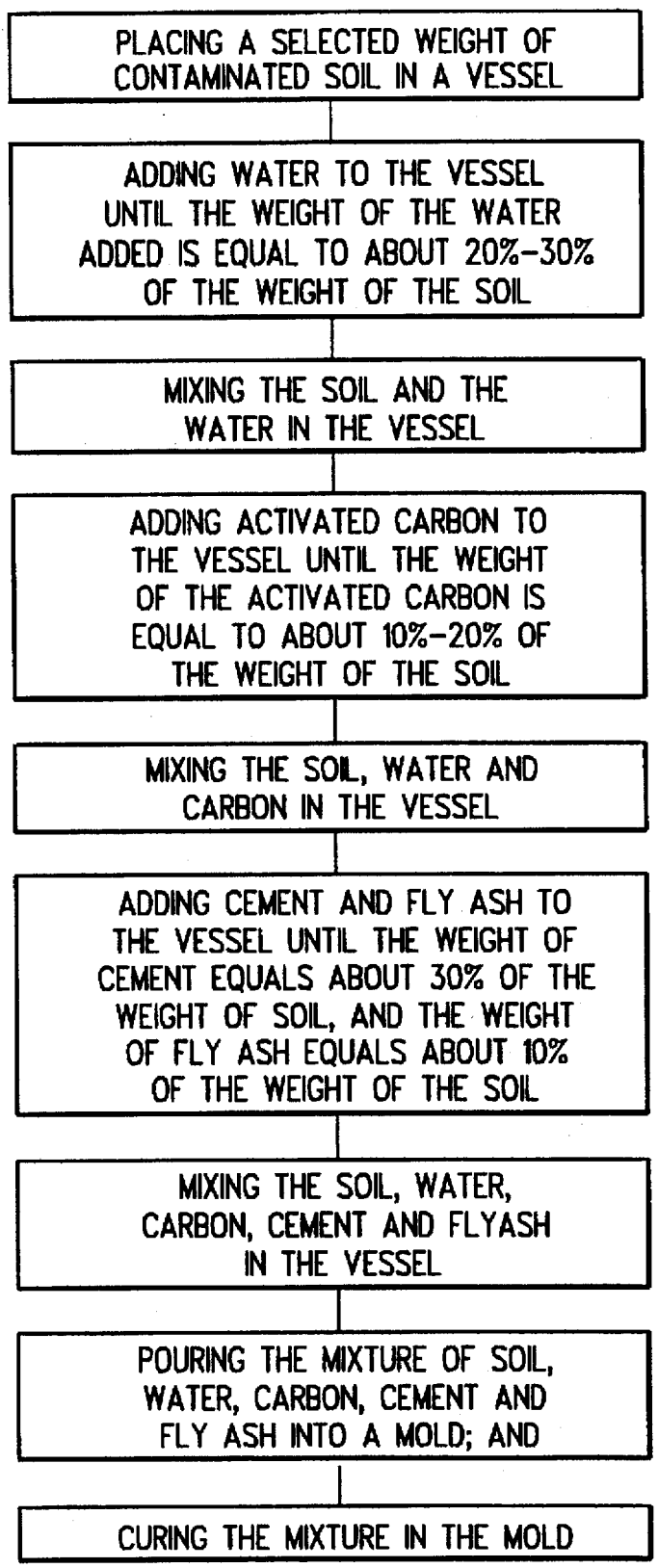
FIG. 1 is a block diagram depicting a series of steps in an illustrative embodiment of the inventive method.

This invention expands S/S applications to soils contaminated with both heavy metals and explosive compounds, by the addition of activated carbon at a crucial point in the solidification process. As depicted in FIG. 1, the S/S process for soils contaminated with heavy metals and explosive compounds is begun with the disposition of a selected weight of the soil in an empty vessel of adequate volume. Water is added to the soil in the vessel until the weight of the water added equals about 20% to 30% of the weight of the soil in the vessel. The soil and water is mixed in the vessel for about 10 minutes. Activated carbon is then added to the mixed material (soil and water) until the weight of the activated carbon is equal to about 10 to 20 percent of the weight of the soil initially placed in the vessel. The soil, water, and carbon is mixed in the vessel for about 10 to 15 minutes. Cement and fly ash are then added to the mixture in the vessel until the weight of the cement added equals about 30% of the weight of the soil in the vessel, and the weight of the fly ash added equals about 10% of the weight of the soil in the vessel. The cement preferably is Portland cement, and the fly ash preferably is type F fly ash. The soil, water, carbon, cement and fly ash are mixed for about 10 minutes and then poured from the vessel into a mold and cured at 23° C. and about 98% relative humidity for about 48 hours.

The advantage of the above described procedure is that it allows for the solidification of soils that are contaminated with heavy metals and explosive compounds. This is particularly advantageous with soils that contain heavy metal concentrations which would preclude incineration. Overall, the cost of the disposal of soils contaminated with heavy metals and explosive compounds may be significantly reduced by the application of this invention.

It is to be understood that the present invention is by no means limited to the particular method herein disclosed and/or shown in the drawings, but also comprises any modifications or equivalents within the scope of the claims. For example, while the inventive method has been described with respect to S/S of sites contaminated with heavy metals and explosive compounds, and while it is believed that the method described herein has particularly beneficial utility in such areas, it will be apparent that the method is applicable to soils contaminated with heavy metals and any other organic compound that can be effectively removed by the use of activated carbon.

What is claimed is:

1. A method for solidification and stabilization of soil contaminated with heavy metals and organic compounds removable by activated carbon, the method comprising the steps of:

placing a selected weight of the contaminated soil in a vessel;

adding water to the contaminated soil in the vessel until the weight of the water added is equal to about 20%–30% of the weight of the soil;

mixing the soil and the water in the vessel;

adding activated carbon to the mixture of soil and water in the vessel until the weight of the activated carbon added is equal to about 10%–20% of the selected weight of the soil placed in the vessel;

mixing the soil, water and carbon in the vessel;

adding cement and fly ash to the mixture of soil, water and carbon in the vessel until the weight of cement added equals about 30% of the selected weight of the soil placed in the vessel, and the weight of fly ash added equals about 10% of the selected weight of the soil placed in the vessel;

mixing the soil, water, carbon, cement and fly ash in the vessel; and pouring the mixture of soil, water, carbon, cement and fly ash into a mold and curing the mixture therein.

2. The method in accordance with claim 1 wherein said soil and water are mixed in said vessel for about ten minutes before said activated carbon is added to said vessel.

3. The method in accordance with claim 2 wherein said soil, water and carbon are mixed for about 10–15 minutes in said vessel before said cement and said fly ash are added to said vessel.

4. The method in accordance with claim 3 wherein said soil, water carbon, cement and fly ash are mixed in said vessel for about ten minutes.

5. The method in accordance with claim 1 wherein said mixture poured into said mold is cured at about 23° C. and about 98% relative humidity.

6. The method in accordance with claim 1 wherein said mixture poured into said mold is cured for about 48 hours.

7. The method in accordance with claim 3 wherein said mixture poured into said mold is cured at about 23° C. and about 98% relative humidity.

8. The method in accordance with claim 7 wherein said mixture poured into said mold is cured for about 48 hours.

9. The method in accordance with claim 1 wherein said fly ash is type F fly ash.

10. The method in accordance with claim 1 wherein said organic compound is an explosive compound.

11. The method in accordance with claim 10 wherein said soil and water are mixed in said vessel for about ten minutes before said activated carbon is added to said vessel.

12. The method in accordance with claim 11 wherein said soil, water and carbon are mixed for about 10–15 minutes in said vessel before said cement and said fly ash are added to said vessel.

13. The method in accordance with claim 12 wherein said soil, water, carbon, cement and fly ash are mixed for about 10 minutes.

14. The method in accordance with claim 13 wherein said mixture poured into said mold is cured at about 23° C. and about 98% relative humidity.

15. The method in accordance with claim 14 wherein said mixture poured into said mold is cured for about 48 hours.

* * * * *